United States Patent [19]

Lange et al.

[11] 4,405,978

[45] Sep. 20, 1983

[54] MICROPROCESSOR BASED COMPUTER TERMINAL

[75] Inventors: Ronald E. Lange; Steve E. King, both of Phoenix, Ariz.

[73] Assignee: Honeywell Information Systems Inc., Phoenix, Ariz.

[21] Appl. No.: 51,473

[22] Filed: Jun. 25, 1979

[51] Int. Cl.³ .............................................. G06F 3/023

[52] U.S. Cl. .................................................... 364/200

[58] Field of Search ... 364/200 MS File, 900 MS File

[56] References Cited

U.S. PATENT DOCUMENTS

| | | | |
|---|---|---|---|
| 3,686,637 | 8/1972 | Zachar et al. | 364/200 |
| 4,014,004 | 3/1977 | Fuller | 364/200 |
| 4,091,448 | 5/1978 | Clausing | 364/200 |
| 4,107,784 | 8/1978 | Van Bemmelen | 364/900 |
| 4,186,438 | 1/1980 | Benson et al. | 364/200 |
| 4,222,111 | 9/1980 | Sloan et al. | 364/900 |

*Primary Examiner*—Thomas M. Heckler
*Attorney, Agent, or Firm*—L. D. Burton; W. W. Holloway, Jr.; L. J. Marhoefer

[57] ABSTRACT

An apparatus for conducting input output operations with another data processing device in a flexible and low cost manner is comprised of a programmed microprocessor coupled to a keyboard, a parallel port, and a modem. The microprocessor is programmed to periodically scan the keyboard to determine what keys if any are depressed. It also scans the parallel port for incoming data and senses incoming data from the modem by sensing a start bit. Control characters from the keyboard can set options such that incoming data from an input can be simultaneously sent out from the modem and/or parallel port.

2 Claims, 16 Drawing Figures

MICROPROCESSOR BASED COMPUTER TERMINAL

BACKGROUND OF THE INVENTION

The application discloses subject matter related to that disclosed and claimed in the patent application Ser. No. 06/51590, filed June 25, 1979 entitled "Low Cost Programmable Video Computer Terminal," now U.S. Pat. No. 4,363,108.

The invention relates generally to the field of digital computer peripherals and more particularly to the field of programmable computer terminals. Prior art terminals utilized expensive cathode ray tubes and special interface chips such as USARTS to accomplish the task of communicating with and displaying information from the main computer. The cheapest terminals available in 1979 were around 500 dollars and not as powerful or flexible as the disclosed terminal.

The hardware disclosed herein is capable of reading and writing on a serial communication line at adjustable speeds up to 600 baud utilizing a modem. It can read a keyboard and read and write from a parallel port. All entering data from any input may be displayed on a black and white television set and all data being displayed may simultaneously be transmitted out the serial or parallel ports. Upper and lower case and page and scroll mode are available and any combination of inputs and outputs can be set from the keyboard. Field reversal is also available. Carriage return, line feed, clear screen, home up and cursor positioning are also available. Finally, a limited graphics capability exists by virtue of a PROM that may be programmed with any graphics patterns desired by an individual user.

The numerous functions and flexibility provided in the disclosed apparatus is due to use of a programmed microprocessor. The low cost is attributed primarily to use of a standard home television set in conjunction with a microprocessor programmed to perform many of the functions formerly performed by separate chips.

The prior art is crowded with computer terminal apparatus. However, the least expensive computer terminal available at the time of filing sold for more than twice as much as the disclosed computer terminal could be built for in kit form. Further, no terminal in the prior art had as many options and capabilities and yet had as low a cost as the disclosed terminal.

SUMMARY OF THE INVENTION

The invention disclosed herein is a subcombination of an overall system said overall system for input-output communications and display of data from another data processing device. The invention could be used alone without the particular display apparatus of the overall system disclosed herein, or it could be used with a printer or another type of display apparatus utilizing a CRT or with different circuitry for utilizing a standard television set. For clarity however, the invention is disclosed in the context of the overall system of the preferred embodiment. Other embodiments will be readily apparent to those skilled in the art.

Broadly speaking, the disclosed terminal consists of a combination of several distinct subcombinations. Each of these can be separately manufactured and used alone or in combination with the other subcombination or in combination with other apparatus which performs the same or similar functions as the subcombinations disclosed herein.

The preferred embodiment described here could be generally divided into two subcombinations. The first is a means for storing data to be displayed and for displaying it on a standard home television set. The second subcombination and the invention claimed herein is a means for sending data to and receiving data from another data processing device or from a keyboard and for presenting this data to the first subcombination for storage and display sent or received in the first subcombination for display. The second subcombination also cooperates in synchronizing the display by the first.

The second subcombination is comprised of a keyboard for entry of data and control signals by a human operator, a parallel port and/or modem, and a microprocessor. Data from the keyboard may be displayed and/or transmitted out from the parallel port and/or the modem.

The parallel port serves to interface between the computer terminal and another nearby data processing device so that data may be sent to and received from the other data processing device in parallel format.

The modem serves to interface between the terminal and another data processing device at a distance from the terminal via the telephone lines or some other communications network. The modem converts binary data from the computer terminal into signals suitable for transmission over the communications network. It also converts signals received from the other data processing device over the communications network into binary data for use by the terminal in display and/or simultaneous transmission out from the parallel port.

The microprocessor is coupled to the keyboard, the modem, the parallel port and the first subcombination by a data bus, an address bus, or one or more control input and output signals. The microprocessor serves to control the input/output communications functions of the computer terminal and, in the preferred embodiment, to supply vertical synchronization and blanking signals, Vert Sync and Blank, to the first subcombination for use by it in the display function.

The input/output functions are controlled by the microprocessor by periodic scanning of the keyboard, the parallel port and the modem to test for incoming data. Control signals sent to the microprocessor via the keyboard control the operation of the system and options selected. Incoming data to the modem is sensed by the microprocessor when a start bit is received comprised of the first transition from a constant stream of logical ones to the first logical zero. The control signals from the keyboard cause the microprocessor to control whether the display by the first subcombination is in the alphanumeric or graphics mode and whether it is white on a black field or black on a white field. They also control whether the display is in the page mode or the scroll mode by supplying to the first subcombination the vertical address of the first line to be displayed. Finally, the microprocessor supplies the data to be displayed to the first subcombination and controls under direction of the operator by control signals from the keyboard whether this data is simultaneously transmitted out from the modem or the parallel port or both. The second subcombination could be used alone without the first if the display function is not desired.

DETAILED DESCRIPTION OF THE PREFERRED EMBODIMENT

Figure 1:
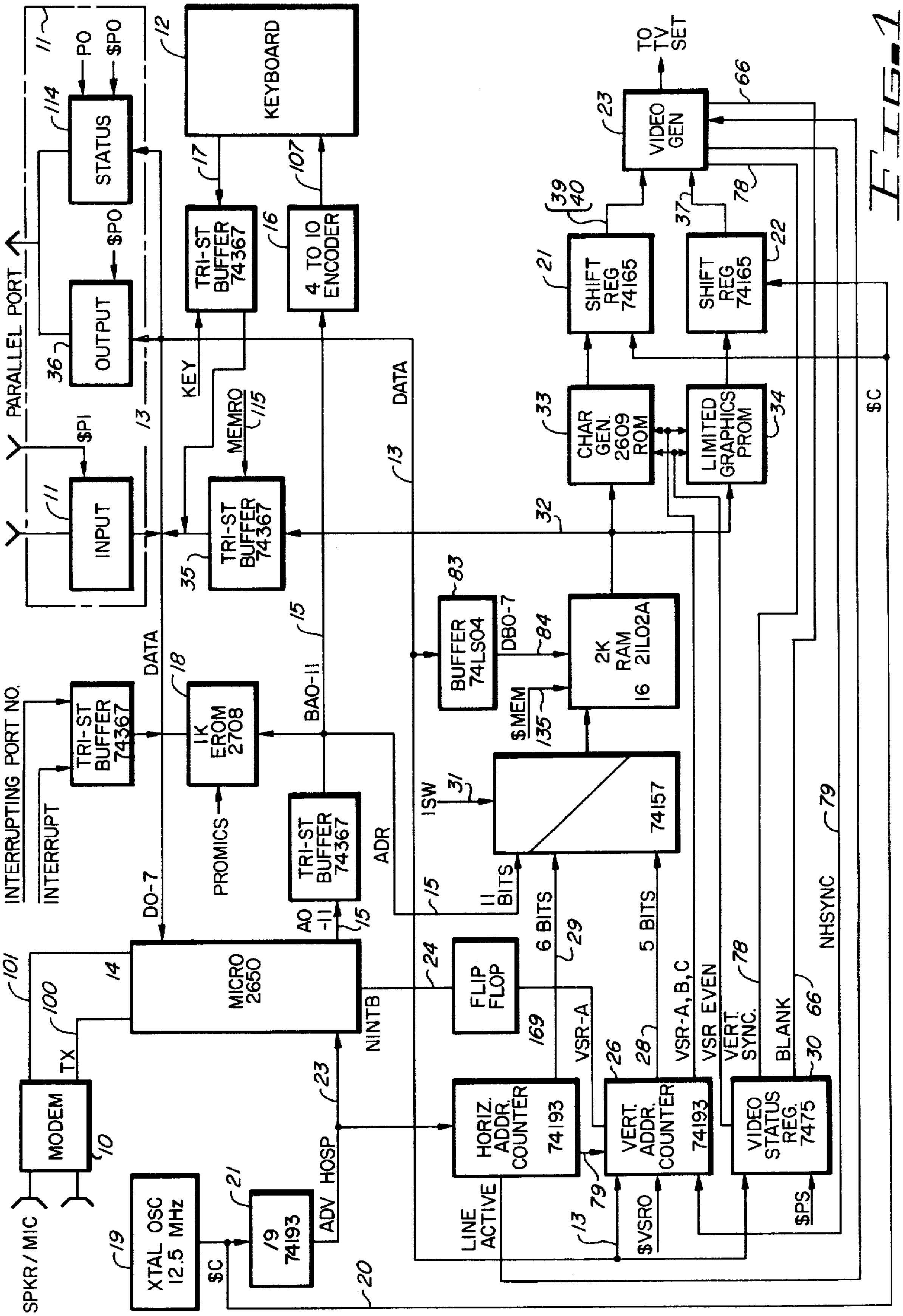
FIG. 1 is a block diagram of the overall system.

Turning now to FIG. 1, the major elements of the system are shown linked together in their overall functional relationship. Data to be displayed enters the terminal either through modem 10, parallel port 11 or keyboard 12. Data from keyboard 12 or parallel port 11 goes to microprocessor 14 over data bus 13.

Microprocessor 14 serves to scan keyboard 12 utilizing address bus 15 and four line to ten decoder 16. By combining the outputs on sense lines 17 caused by closure of keys on keyboard 12 with the address bit pattern on the portion of the address bus 15 causing the particular outputs on sense lines 17 (scan lines 107, see FIG. 14), microprocessor 14 determines which key has been depressed and encodes this data into the proper character in ASCII code.

Modem 10 handles serial input and output for microprocessor 14 by linking it to another device through the telephone lines or some other communications network. Two pairs of frequencies, one pair for transmitting and one pair for receiving are used for frequency shift keying modulation.

Erasable Read Only Memory (EROM) 18 holds the series of preprogrammed instructions that microprocessor 14 executes in controlling the functions of the terminal. The program can be changed to suit individual user needs and serves only to define the functionality of the general purpose microprocessor 14 in the overall functionality of the apparatus disclosed herein. The particular algorithm of the preferred embodiment consists of a main program loop that is interrupt driven by the NINTB signal set by vertical address counter 26 via flip flop 169 and line 24. The main loop controls the vertical sync and blanking by counting interrupts. The interrupt function also provides the timer base for scanning of the keyboard, and interrogating the parallel port flags and modem. At different intervals, the main loop will branch to other subroutines which handle the serial input function, the serial output function, the keyboard scan, and the parallel port input flag scan. As each character is received, the program must determine what is to be done. Regular characters for display will be stored in the RAM while control characters each cause a separate function such as the graphics option, field reversal, and peripheral attachment of modem, screen and parallel port.

All timing for generation of the video display is developed from a clock 19. The oscillator output $C on line 20 is sent to character shift registers 21 and graphics shift register 22 where it is used to shift the character or graphics information dot line byte to video generator 23 one bit at a time. Sixty four characters are displayed on each horizontal scan line, each character comprising a dot matrix nine dots wide and sixteen lines of dots tall. There is room for 89 characters per line but the excess over 64 is used for margins on the left and right. Character shift register 21 or graphics shift register 22 shift out one horizontal row of the dot matrix for every character display time. The character display time is the time it takes to shift out nine dots at a rate of one dot for every period of crystal oscillator 19. A dot time is the inverse of the clock frequency or eighty nanoseconds.

The character times are marked for microprocessor 14 and horizontal address counter 22 by divide by nine counter 21. This is done by generating the Advhosp signal on line 23 every ninth period of the clock. By counting the number of Advhosp signals, microprocessor 14 knows when the end of each horizontal line is reached. By keeping track of the Int B signal on line 24, the microprocessor knows when to turn on the vertical blanking signal, Blank on line 66, and the vertical sync signal, Vert Sync on line 78, via data bus 13.

Horizontal address counter 22 counts out eighty-nine character spaces per line and serves to supply the horizontal address of the character to be accessed from RAM memory 25 via line 29. It also serves to generate the Hsync signal marking the end of each horizontal line and the Line Active signal for horizontal blanking to create the left and right margins.

A vertical address counter 26 serves to keep track of which line is being displayed and, more specifically, which line of the sixteen line tall dot matrix for each character is being traced. Each horizontal sync pulse, Nhsync on line 79, advances vertical address counter 26 one count indicating the trace has moved down one line. Flip Flop 169 is set and reset by the first bit of vertical address counter 26.

The T.V. picture uses interlaced scan such that eight horizontal lines are traced out for each line of characters displayed in a first half frame and another eight during the next half frame. The second half frame is traced in the interstices of the first half frame.

Microprocessor 14 can load the vertical address counter 26 with an initial vertical address count via data bus 13. In this manner, the microprocessor controls the display as page mode or scroll mode by designating the vertical address of the first line to be displayed in each frame. The microprocessor is also used in the preferred embodiment to develop the Blank signal on line 66 and the Vert Sync signal on line 78 by setting these bits in video status register 30 via data bus 13. In other embodiments, the vertical address counter 26 could be used to generate the vertical sync and blanking information.

The vertical character address count from vertical address counter 26 is coupled to a portion of the horizontal and vertical address input of a two line to one line multiplexer switching means 27 on line 28. Horizontal address counter 22 also sends its count, the horizontal character address, to the remaining portion of the horizontal and vertical address input of multiplexer switching means 27 via line 29.

Multiplexer switching means 27 serves to supply an address to RAM 25 by switching the address from either the address bus 15 coupled to an address bus input or the horizontal and vertical character addresses on lines 28 and 29 coupled to the horizontal and vertical address input. One of these two inputs is switched to the multiplexer output line coupled to the address input of the RAM. Switching is controlled by the ISW signal on line 31 under the control of the address bus 15 of microprocessor 14.

Figure 5:
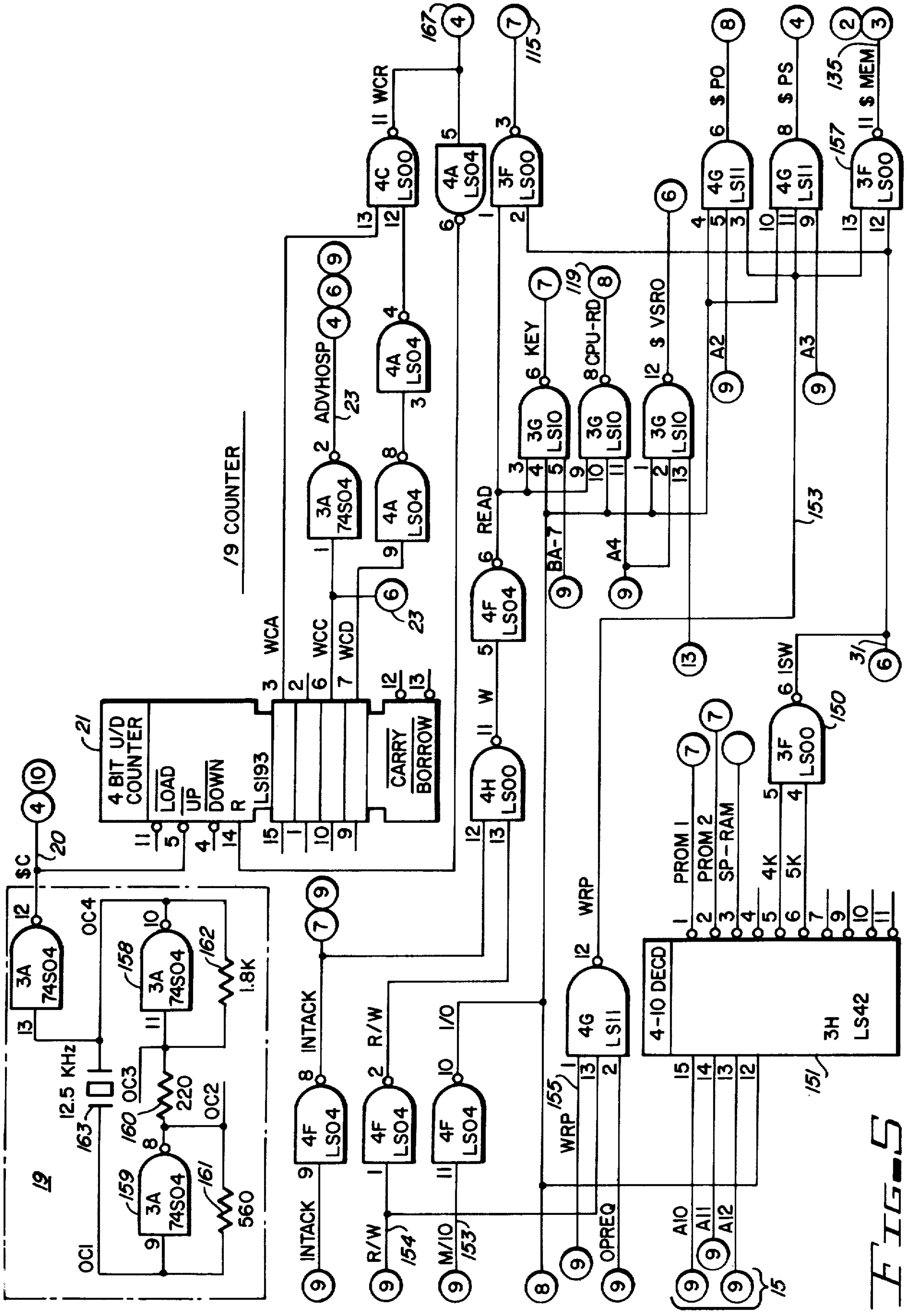
FIG. 5 is a logic diagram of the clock and the divide by nine counter.

Microprocessor 14 serves to fill the RAM with the characters to be displayed one line at a time via the RAM data input lines 84. It does this by writing the ASCII character data from data bus 13 to the memory locations specified to the RAM by address bus 15. Address bus 15 is switched through multiplexer 27 to the address input of the RAM. A $Mem signal on line 135, controlled by microprocessor 14, controls whether RAM 25 functions in the read or write mode. Microprocessor 14 simultaneously controls the address switching by multiplexer switching means 27 via the ISW signal on line 31. ISW is controlled by the address appearing on address bus 15 as shown in FIG. 5. When microprocessor 14 is not loading RAM 25, ISW causes the address outputs from the horizontal and vertical address counters to be switched to the multiplexer output line 82 to form an address to access the character data stored in RAM 25. This data is used for display or transmission out from the parallel port or modem or all of the above depending upon the wished of the operator as indicated by the control characters entered from the keyboard. In other embodiments, preprogrammed binary data may be placed in a ROM and substituted for RAM 25 for applications where the data need not change such as in educational applications. This would eliminate the need for the keyboard, ports, multiplexer and the microprocessor (if the counters were modified to supply vertical sync and blanking signals).

The character data output from the RAM leaves via output line 32 and forms a character data input for both the character generator ROM 33 and the limited graphics PROM 34. These read only memories are programmed with groups of bytes representing the specific dot patterns of light and dark dots recognizable by humans as the ASCII set of alphanumeric characters or any of the sixty four special graphics patterns capable of being displayed by the terminal. Graphics PROM 34 uses the low order six bits of the data from the RAM to display a 2×3 pattern in place of the ASCII character. This graphics capability can be visualized by dividing the 9×16 character dot matrix into six rectangular regions in 2×3 matrix arrangement. One of the six low order bits used for graphics is assigned to each rectangle. If a particular bit is on, then its corresponding rectangle will be lit on the screen by a dot pattern output from graphics shift register 22 which corresponds to lighting all the dots in the 9×16 dot matrix within the particular rectangle to be lit. Both the character generator ROM 33 and the limited graphics PROM 34 output a dot line byte in parallel format in response to the character data presented at their respective inputs. The first three bits of the vertical address counter output are used by these memories to determine which line of dots in the vertical dimension of the matrix to retrieve and present at the dot line output. This dot line byte is sent to the character shift register and graphics shift register in parallel format and is shifted out therefrom serially at the rate of one dot for every period of the clock.

By activating tri-state buffer 35 via the Memro signal on line 115, the output character data from the RAM can be directed out parallel port 11 via output register 36 and to microprocessor 14 via data bus 13 for transmission by modem 10. The Memro signal is controlled by microprocessor 14 as shown in FIG. 5.

Video generator 23 combines the video information received from character generator ROM 33 or limited graphics PROM 34 with the horizontal and vertical sync signals and blanking signals to form the composite video output signal Vout on line 136 to the T.V. set. The Vout signal is approximately two volts for white information and 0.75 volts for black information, with sync information dipping to the zero volt level if negative going sync is used. If positive sync is used, the order is reversed i.e., sync is +5 volts and white is about +0.75 volts. The output from the video generator is fed into the video amplifier of the T.V. set used for display.

FIG. 4 details the operation of the logic of video generator 23 and character generator ROM 33. To better understand it, a more detailed explanation of the T.V. picture is necessary. The raster of any T.V. picture is comprised of many parallel horizontal lines traced across the screen by an electron beam. The intensity of this beam is varied to cause small phosphorus dots affixed to the screen which the electron beam hits to emit light of an intensity proportional to the intensity of the electron beam. As the beam sweeps across the screen a line of glowing phosphorous of varying shades of black and white will be formed.

In a computer terminal application we are interested in displaying a few lines of characters on the screen. To do this each character must be broken down into a matrix of light and dark dots in a pattern recognizable by the operator as the desired character. In the preferred embodiment disclosed herein, the dot matrix is nine dots wide and sixteen lines of dots tall. Sixty four of these dot matrices or characters will be displayed on each line of characters put on the screen. A line of characters will require sixteen horizontal lines, one for each line of dots in each character dot matrix.

Figure 6:
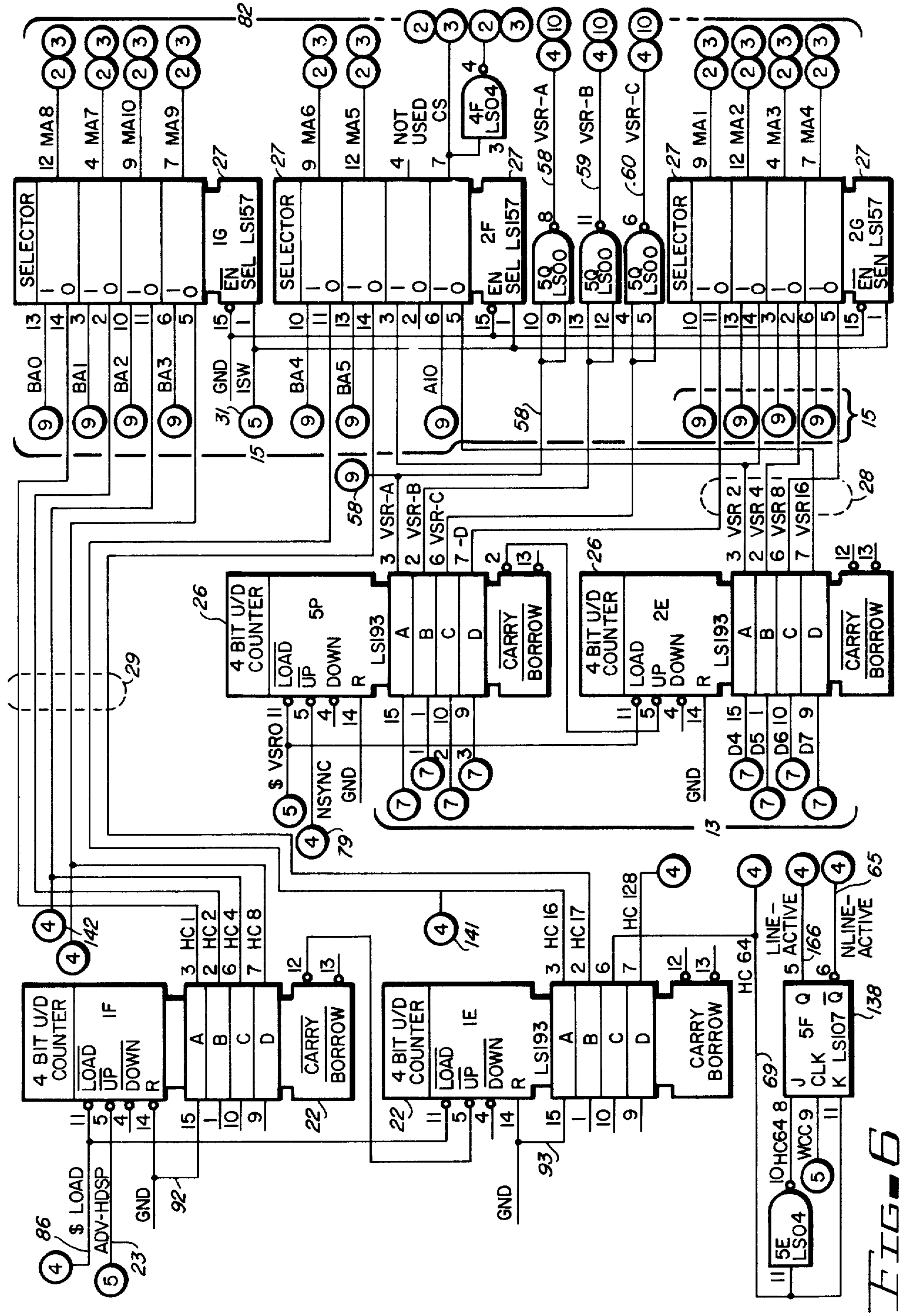
FIG. 6 is a logic diagram of the horizontal and vertical counters and the two line to one multiplexer switching means.

The clock frequency is 12.5 mhz and has a period of one dot time or 80 nanoseconds giving a total character display time of 720 nanoseconds. The period of one line therefore is 64 microseconds comprised of 57 microseconds for the sweep to go from left to right and 7 microseconds to return to the left side of the screen. The beam must be turned off for the retrace and to create blank left and right margins on either side of the displayed text. This is the purpose of the Nline-Active signal on line 65. In order to ensure that there is an adequate border at the left and right of the display, only 48 microseconds of the 57 microsecond sweep time is actually used for display of characters. Referring to FIG. 6, it is seen that the Nline-Active signal is controlled by the HC64 bit from horizontal address counter 22. This counter is advanced once for every character display time by the Advhosp signal on line 23. When a count of 64 is reached, HC64 goes high. This resets flip flop 138 causing Nline-Active to go high thereby grounding line 50 and darkening the screen until HC64 again goes low. When a count of 72 is reached, gate 139 in FIG. 4B generates the $Load signal on line 86 thereby clearing flip flop 140. The resulting low NHsync signal on line 79 propagates through gates 88 and 90 in FIGS. 4A and 4B and grounds Vout on line 136 via the Sync signal on line 81. Flip flop 140 is set when the HC16 and HC4 bits on lines 141 and 142 are high. At the count of 72, Horizontal Address Counter 22 in FIG. 6 is preset to a −17 count by the $ Load signal on line 86 to the Load input and hardwire grounds 92 and 93 to the "A" inputs. All floating inputs go high or stay high when $ Load occurs. Thus HC64 remains high causing Nline-Active on line 65 to remain high thereby blanking the scan. The horizontal address counter 22 then begins counting forward to zero. At a count of −11, both HC16 and HC4 on lines 141 and 142 in FIG. 4 go high setting flip flop 140 and raising the Hsync signal. When the count reaches zero, HC64 goes low thereby lowering Nline-Active on line 65 and enabling the display.

The T.V. picture is comprised of 262½ parallel, horizontal lines traced at a rate of thirty frames per second. Interlaced scan is used. Thus a thirty frames per second tracing rate as used here means 60 half frames are traced every second with each half frame comprised of 262½ lines. The next half frame of 262½ lines are interlaced between the lines of the previous half frame. At 525 lines per frame and 30 full frames per second, the T.V. horizontal sweep frequency is 15,750 lines per second. The vertical sweep frequency is therefore 60 half frames per second.

Both the T.V.'s horizontal and vertical sweep oscillators must be locked in sync with the character data to be displayed from the RAM to make an intelligible picture. To accomplish this synchronization and to establish blank margins at the top and bottom and left and right of the twenty-four lines of displayed text four signals must be developed. Synchronization of the horizontal sweep oscillator is accomplished by the Hsync signal on line 79 and synchronization of the vertical sweep oscillator is accomplished by the Vert. Sync signal on line 78. Blanking of the video information from the right of the last character in a line of text through retrace and up to the first character in the next line is accomplished with the Nline-Active signal on line 65. The Blank signal on line 66 causes blanking from the right of the last character of the last line of the twenty-four lines of text through tracing of the lower blank margin, vertical retrace and through tracing of the top margin to the first character of the first line of text in the next frame.

Horizontal address counter 22, vertical address counter 26 and microprocessor 14 generate these four synchronization and blanking signals. The horizontal address counter counts out the eighty nine character display periods in each line and causes the Nline-Active signal to blank out the video signal to the left and right of the sixty four characters displayed in each line of text. The horizontal address counter also causes the Hsync signal to be generated at the end of each line.

The Nhsync signal on line 79 in FIG. 6 drives the vertical address counter 26 at the UP count input. This counter provides the vertical address data of the line being traced. This vertical address is used by RAM 25 in accessing the character to be displayed. The first bit of the output, VSR-A, is used to set the interrupt flip flop 169 in FIG. 9. This flip flop sends an NINTB signal to the INTREQ input of microprocessor 14 for every positive pulse or high state of VSR-A. Since VSR-A toggles at every Nhsync signal, microprocessor 14 is interrupted every second line in each half frame.

The Vert Sync and Blank signals are controlled by microprocessor 14 by setting or resetting of the Vert Sync and Blank bits of video status register 30 in FIG. 4. The microprocessor decides when to turn Vert Sync and Blank on and off by counting interrupts. Four subroutines each starting at a different interrupt count are used to do this. One routine turns on the screen to start the display. The first thing it does is load the vertical address counter with the address of the first line to be displayed. By controlling this address, either the scroll mode or page mode of display can be used. The routine then loads an internal register in microprocessor 14 used to keep track of the interrupt count with the count at which the next subroutine is to be entered. This internal register is decremented at each interrupt until the count reaches zero at which time the next subroutine is entered. Finally, the routine starts the display by turning the Blank signal off. This allows gate 77 to enable gate array output line 50 thereby enabling video information to be developed on the Vout line 136. The twenty-four lines of text are then displayed with each interrupt decrementing the internal interrupt count register.

The Blank signal must be turned back on at the end of the last line of text. A second subroutine, which is entered when the interrupt count register reaches zero, performs this task. It also resets the interrupt count register to another count such that a third subroutine will be entered after the last line of the half frame has been traced. Finally it checks to see if the half frame being traced is even or odd scan and sets the VSR-EVEN bit of video status register 30 in FIG. 4A.

The third subroutine functions to turn on the Vert Sync bit ("on" equals "low") to cause vertical flyback of the electron beam from the bottom to the top of the screen. The Vert Sync signal on line 78 in FIG. 4 is gated through gates 88 and 90 to ground the Vout line 136. The microprocessor keeps the Vert Sync bit on for three interrupts by setting the internal interrupt count register to three. Thus, the fourth subroutine will be entered three interrupts later to turn the Vert Sync bit off. Because interlaced scan is used, the Vert Sync signal must be triggered in the middle of the last line in every other half frame. The third subroutine functions to provide for this delay depending upon whether the scan is even or odd as determined by the second subroutine.

The fourth subroutine serves to turn the Vert Sync bit off at the top of the new half frame. It also sets the interrupt count register to the count necessary to branch to the first subroutine to turn off the Blank signal at the beginning of the first line of text so as to provide a top margin of blank lines. This subroutine also toggles an internal scan bit changing the type of scan from even to odd or odd to even. These four subroutines are each executed once for each half frame and are merely illustrative of the scheme used in the preferred embodiment. Other programs may be used or the microprocessor may be eliminated altogether in some embodiments.

As described earlier, each of the twenty-four text lines of characters displayed per frame consist of sixteen horizontal lines of dots. Four of these 16 lines, two at the top and two at the bottom, are left blank in the programmed matrices stored in the character generator ROM 33. These four blank lines of dots act as spacers between the lines of text. In all, 384 lines of the frame are used for the twenty-four text lines, the remaining available lines being used as top and bottom margins.

Figure 4A:
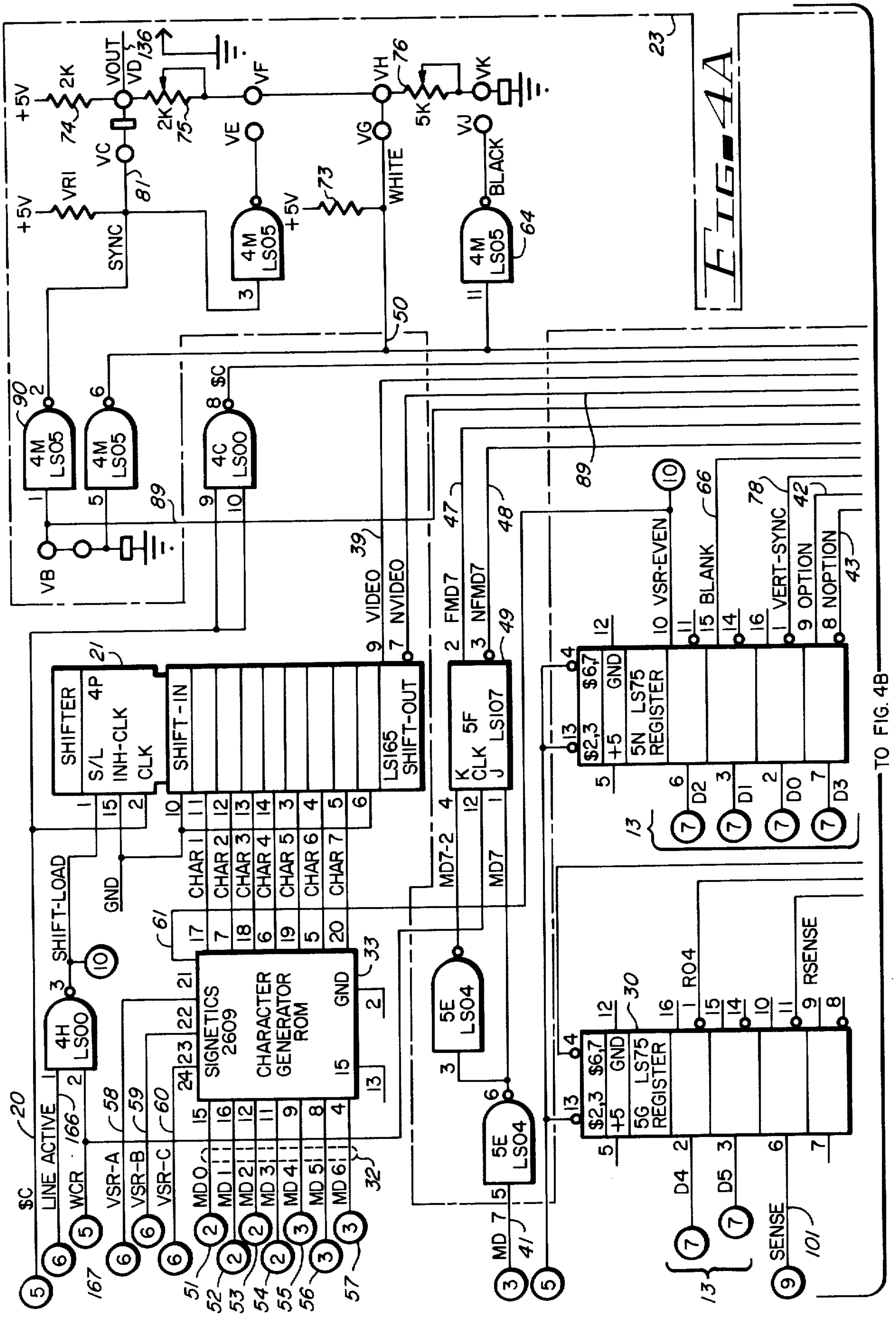
FIGS. 4A and 4B are a logic diagram of the video generator
Figure 10:
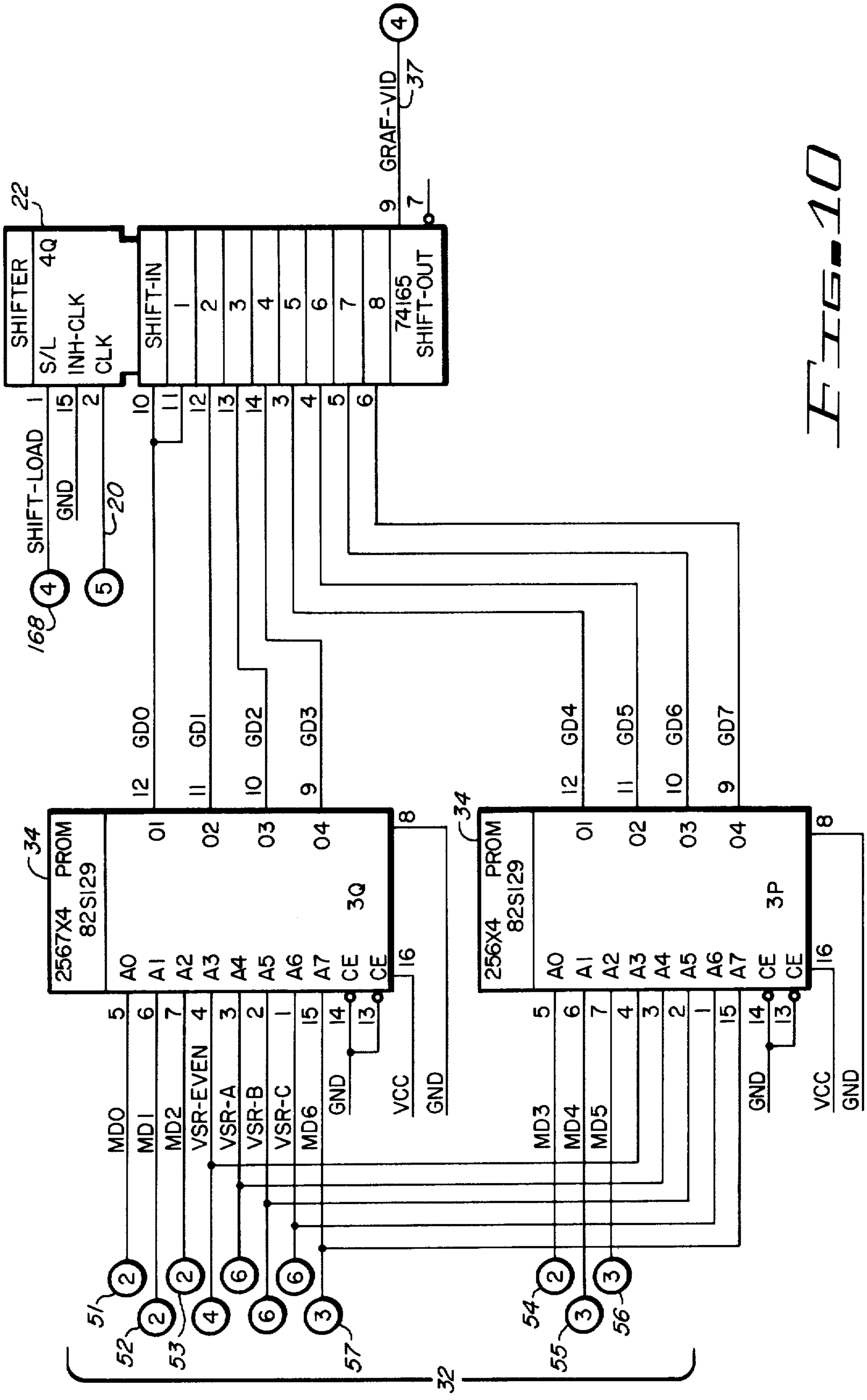
FIG. 10 is a logic diagram of the graphics option.

The output signal of clock 19, $C on line 20, is fed to character shift register 21 and graphics shift register 22 in FIG. 4A. Character generator 33 loads character shift register 21 in parallel format with seven binary bits representing one horizontal line of the dot matrix of the character to be displayed. Two dots of the nine, one on the left and one on the right, are left blank (logical zero) for spacing purposes. These bits are shifted out one per clock cycle on line 20 as the video and Nvideo signals on lines 39 and 40. A similar situation occurs with graphics shift register 22 and graphics PROM 34 in FIG. 10. The graphics video information is the Graf-Vid signal on line 37 in FIGS. 10 and 4.

Figure 4B:
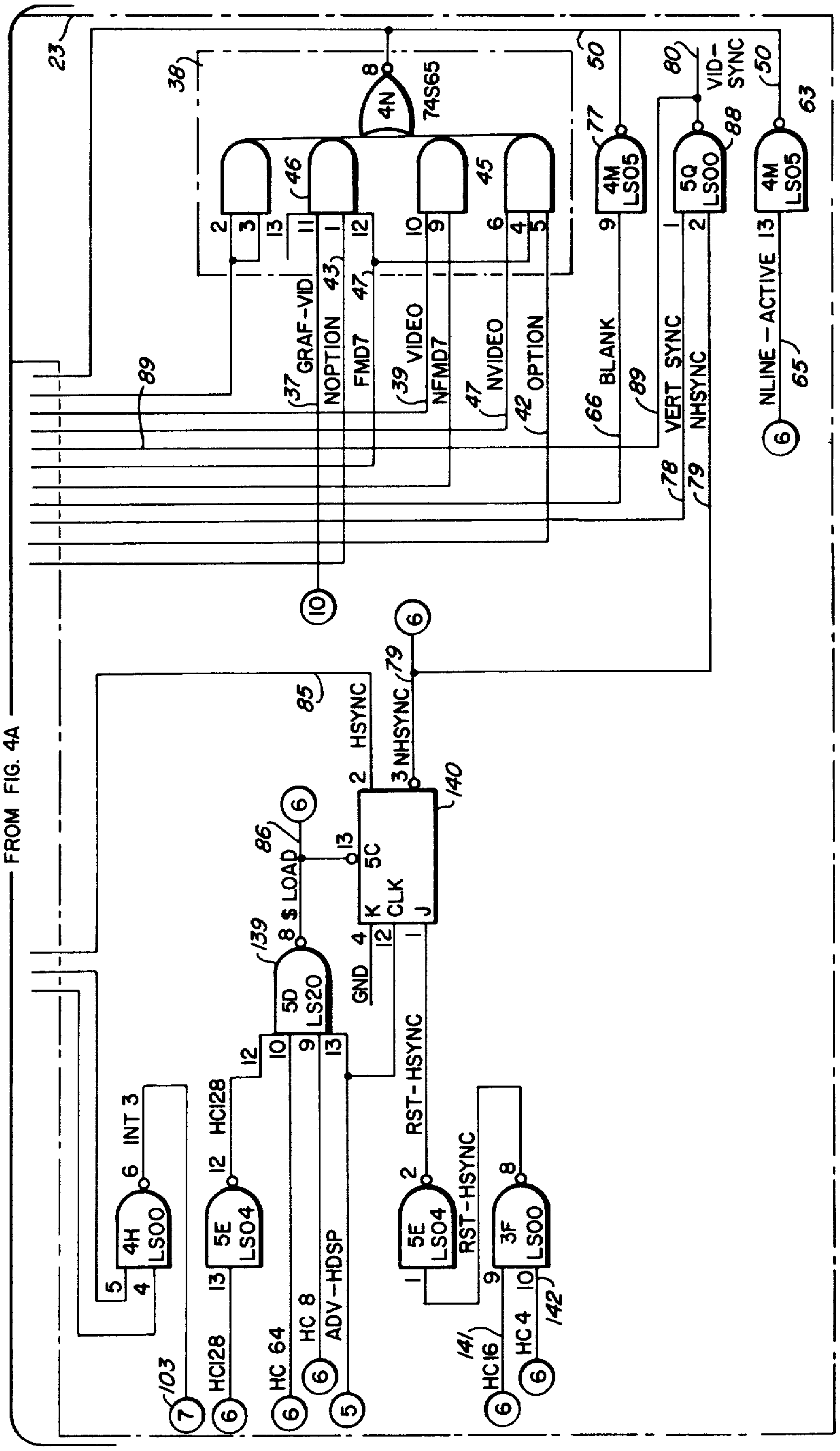

The video information from shift registers 21 and 22 enters gate array 38 in FIG. 4B. This gate array can be a 74 S 65 integrated circuit in the TTL family of the and-or-invert gate variety. Only one gate of this array is used at any one time to gate dot pattern video information through to the T.V. set.

The reason four gates are needed for the video gating function performed by gate array 38 is to accommodate the terminal field reversal and graphics option capability. Each character can be displayed as either white on a black field or black on a white field. The eighth bit of memory storage for each character is used to determine the field setup. This bit, MD7 on line 41, will cause a black on white display when it is off and the graphics option (controlled from the keyboard) is off. The graphic option status is set by the microprocessor in response to a control character from the keyboard. The microprocessor sets the option bit of video status register 30 in FIG. 4A via data bus 13.

As seen from FIG. 4B, when the graphics option is off, gates 45 and 46 have opposite signals at their inputs such that Graf-Vid signal on line 37 is barred and the Nvideo signal on line 40 is allowed through to the T.V. set. Field format is reversed with the Video and Nvideo signals. Nvideo is gated through if the FMD7 and NFMD7 signals are in one state and the Video signal on line 39 is gated through if FMD7 and NFMD7 are in the opposite state. The FMD7 and NFMD7 signals on lines 47 and 48 indicate the state of field reversal flip-flop 49 and control whether the display is black on a white field or white on a black field. The state of this flip flop is controlled by the state of the MD7 signal (the seventh bit of the character word stored in memory) on line 41. A control O is entered from the keyboard to reverse the field format. A control N is entered from the keyboard to enable the graphics option.

It is seen from the above that, depending upon the states of the field reversal flip flop 49 and the graphic option signals on lines 42 and 43, several different dislay possibilities are presented. Summarizing these possibilities:

| MD7 | Graphics Option | Display Type |
|---|---|---|
| off | off | Black on White |
| on | off | White on Black |
| off | on | Black on White |
| on | on | Graphics Option |

The output of gate array 38 on line 50 will be high if the screen is to be white and will go low for black for negative sync.

Character generator 33 needs a character data input for providing the address from which to retrieve the dot line byte comprising one line of dots in the character dot matrix. The seven bits of ASCII code for the character to be displayed are presented to the character generator on lines 51–57 as the MDØ-6 signals in FIG. 4A from the RAM 25 (shown in FIGS. 2 and 3). Three other signals, VSR A, B and C on lines 58–60 respectively plus VSR-Even on line 61 form the address where a dot line byte from the dot matrix comprising the character to be displayed may be found. The VSR A, B and C signals represent the first three bits of the vertical address from vertical address counter 26 (shown in greater detail in FIG. 6). These three bits tell character generator 33 which horizontal line of dots to display of the sixteen lines of dots in the vertical dimension of the dot matrix. The MDØ-6 signals make up the address of the dot matrix of the character to be displayed and represent the balance of the vertical address. VSR-Even on line 61 indicates which half of the frame is being displayed and is controlled by bit D2 on the data bus 13 from the microprocessor 14 which is serviced by the second subroutine described earlier.

Character shift register 21 receives the parallel format dot line byte from character generator 33, as the Char 1–7 signals. This shift register shifts the dot line byte out serially as the Video and Nvideo signals on lines 39 and 40 of FIG. 4A at the rate of one dot for every cycle of the SC signal on line 20. These data bits propagate through gate array 38 and into the adjustable sync network 62.

The Line-Active signal on line 65 feeds open collector inverters 63 and 64 so as to darken the screen from the right of the last character in the line of text through retrace and then right again to the first character in the next line. The Line-Active signal on line 65 is controlled from Line-Active flip flop 68 in FIG. 6 which is itself controlled by the HC64 bit on line 69 from horizontal address counter 22. Line-Active is high when HC64 is low.

Likewise, the Blank signal on line 66 serves to blank (force to black) the video output from gate array 38 on line 50 from the end of the last line of text through vertical retrace and through the top margin up to the first character in the first line of text in the next frame. The Blank signal is controlled by microprocessor 14 through the D1 bit of data bus 13.

Figure 13:
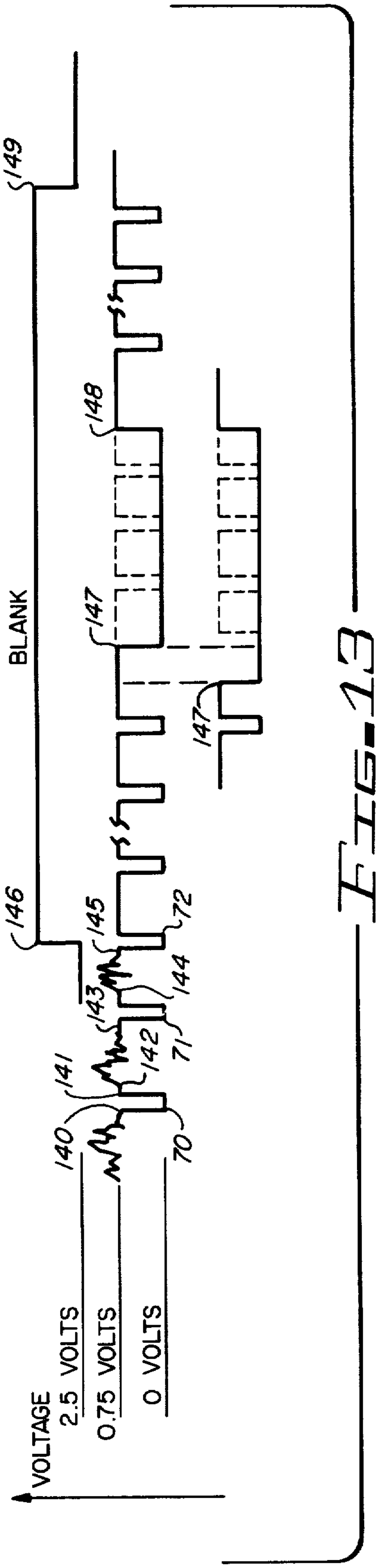
FIG. 13 is a drawing of the composite video signal.

The composite video output signal to the T.V., Vout on line 136, is illustrated in FIG. 13. Negative going horizontal sync pulses are shown at 70, 71, 72 etc. When these pulses fall to zero volts, the horizontal sweep oscillator in the T.V. forces the electron beam to return to the left side of the screen. In FIG. 13 the effect of the Line-Active and Hsync signals is seen clearly. Point 140 corresponds to a count of seventy two at the outputs of horizontal address counter 22 in FIG. 6. At this point, the counter is preset to a −17 count as explained earlier. Point 141 in FIG. 13 represents the point in time when horizontal address counter 22 reaches a −11 count and resets flip flop 140 in FIG. 4B. Point 142 represents a zero count and the setting of the Line Active flip flop 138 in FIG. 6. The time between points 141 and 142 represents the time when the NLine-Active signal on line 65 in FIG. 6 is high resulting in grounding of line 50 in FIG. 4 and blanking of the screen. From point 142 to 143 in FIG. 13 represents the video information of the dot patterns being displayed. Point 143 also represents the achievement of a count of sixty four by horizontal address counter 22 and the raising of NLine-Active. The resultant grounding of line 50 forces the video signal to black again until the horizontal address counter again reaches zero at point 144. It can be seen from the foregoing that the NLine-Active signal is responsible for creating the margins at the left and right of the display.

The margins at the top and bottom of the display are created by the Blank signal on line 66 in FIG. 4. In FIG. 13, point 145 marks the end of the last line of text. At this time, the Blank signal is turned on by microprocessor 14 with the triggering event being transmission of the Hsync signal at the end of the last line of text in the half frame at point 146. Several more blank horizontal lines are traced below the last line of text while the Blank signal is on until microprocessor 14 has counted enough Hsync signals to indicate the last line in the half frame has been traced. At point 147, Microprocessor 14 sets the Vert Sync bit on via data bus 13. Microprocessor 14 is programmed to hold the Vert Sync signal on for at least three horizontal line periods such that the internal circuitry of the television set can distinguish between the vertical and horizontal synchronization signals. At point 148, Vert Sync is turned off by microprocessor 14 and horizontal tracing begins anew. The Blank signal has been on all the time however so the horizontal lines traced are blank. In this manner a top margin is created. At point 149, the Blank signal is turned off and character display for the next half frame begins. Microprocessor 14 is programmed to delay point 147 in time one half of a horizontal line scan time every other half frame. In this manner vertical flyback occurs in the middle of the last line every other half frame thereby returning the electron beam to the middle of the first line. Interlaced scan is achieved in this manner since the middle of a "horizontal" line is below the left end thereof by an amount equal to half the drop of the line.

The video data portion of Vout will reach its most positive point with all the input gates of gate array 38 disabled. Resistor 73 in FIG. 4A serves as a pullup resistor for the open collector gates of gate array 38. The high voltage level of Vout will be controlled by the voltage divider formed by 2K resistor 74 in series with potentiometers 75 and 76. If any of the gates of array 38 or the Line-Active gate 63 or the Blank gate 77 is enabled, then line 50 is grounded. The Vout potential is then developed across only potentiometer 75 of the aforementioned voltage divider thereby dropping Vout to a lower voltage. With either the Vert Sync signal on line 78 or the NHsync signal on line 79 enabled (low), the Vid-Sync signal on line 80 is in the logical one state causing the sync signal on line 81 to ground Vout.

The adjustable sync network 62 allows changes in the terminal circuitry to be made such that the terminal is compatible with television sets with positive sync. The sync pulses in positive sync sets are positive going to the +5 volt level while black is at the next highest level (around 2.75 volts) and white is the lowest level (around 0.75 volts). The adjustable sync network 62 provides spots for making suitable cuts and adding suitable jumpers such that inverters may be added to invert both the video information on line 50 and the sync information on line 89 such that the above voltage scheme may be achieved.

Figure 2:
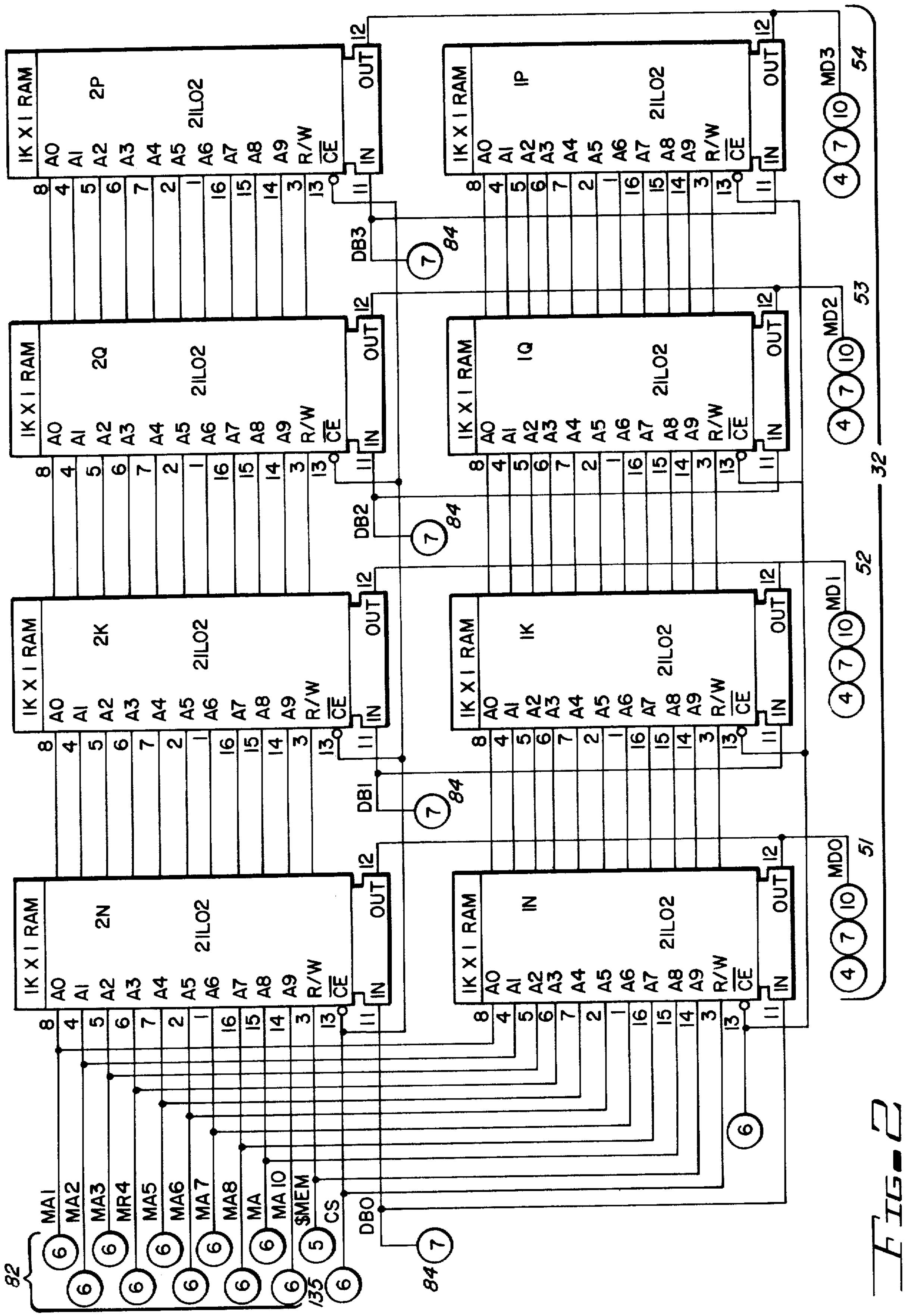
FIGS. 2 and 3 are logic diagrams of the RAM.
Figure 3:
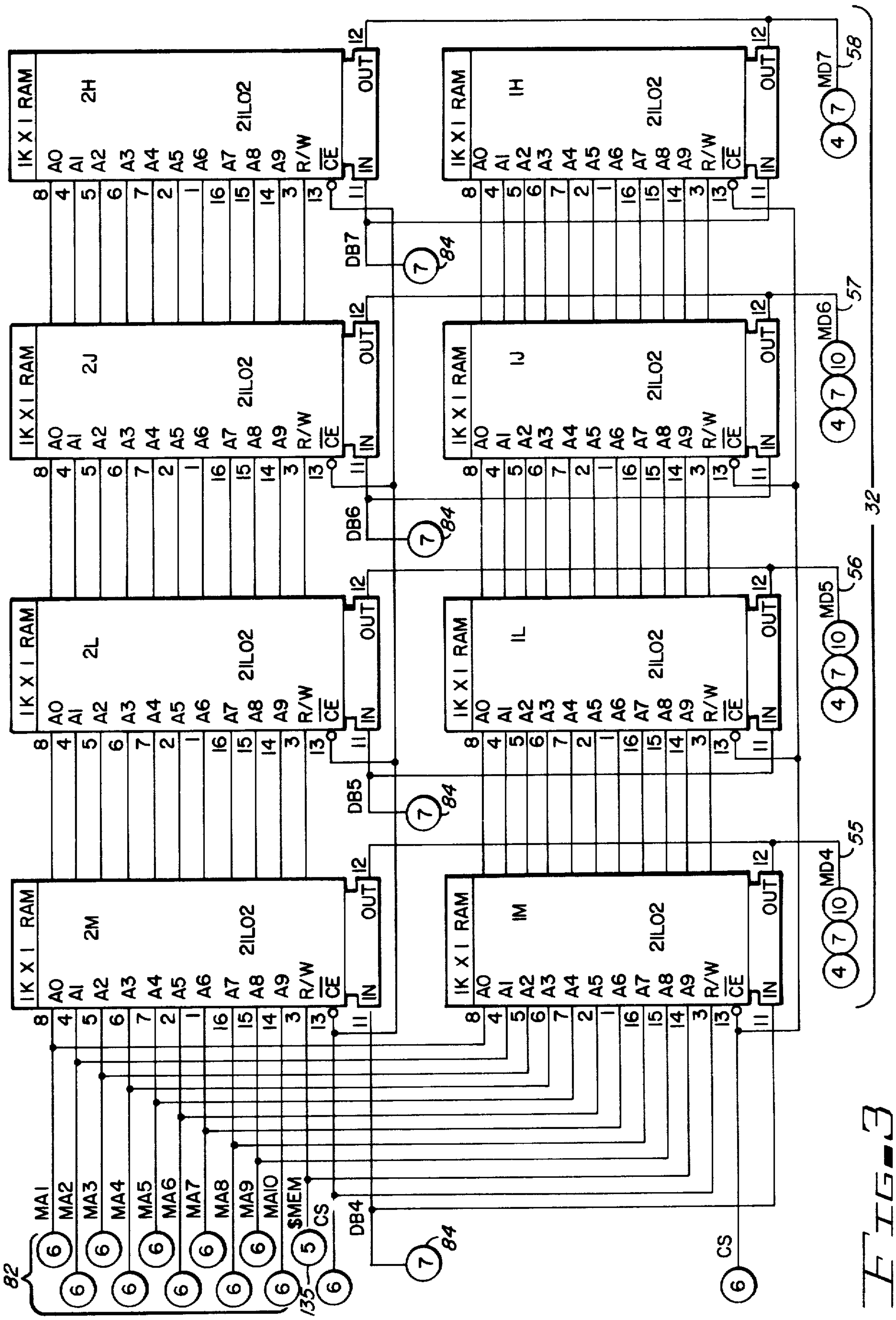

A logic diagram of RAM 25 device is shown in FIGS. 2 and 3. The address to store the incoming character or to retrieve the character to be displayed is supplied via address input lines 82 (MA1–MA10) from two line to one line multiplexer 27 (shown in more detail in FIG. 6). This multiplexer serves to select, under the control of microprocessor 14 via the ISW signal of FIGS. 1 and 5, which set of inputs will be switched to its output lines. FIG. 6 shows the horizontal address counter output lines (HC1, HC2, HC4, HC8, HC16, HC32, HC64) and the vertical address counter output line 30 (VSR-D, VSR2, VSR4, and VSR8) to be connected to the two sets of inputs of multiplexer 27.

Figure 7A:
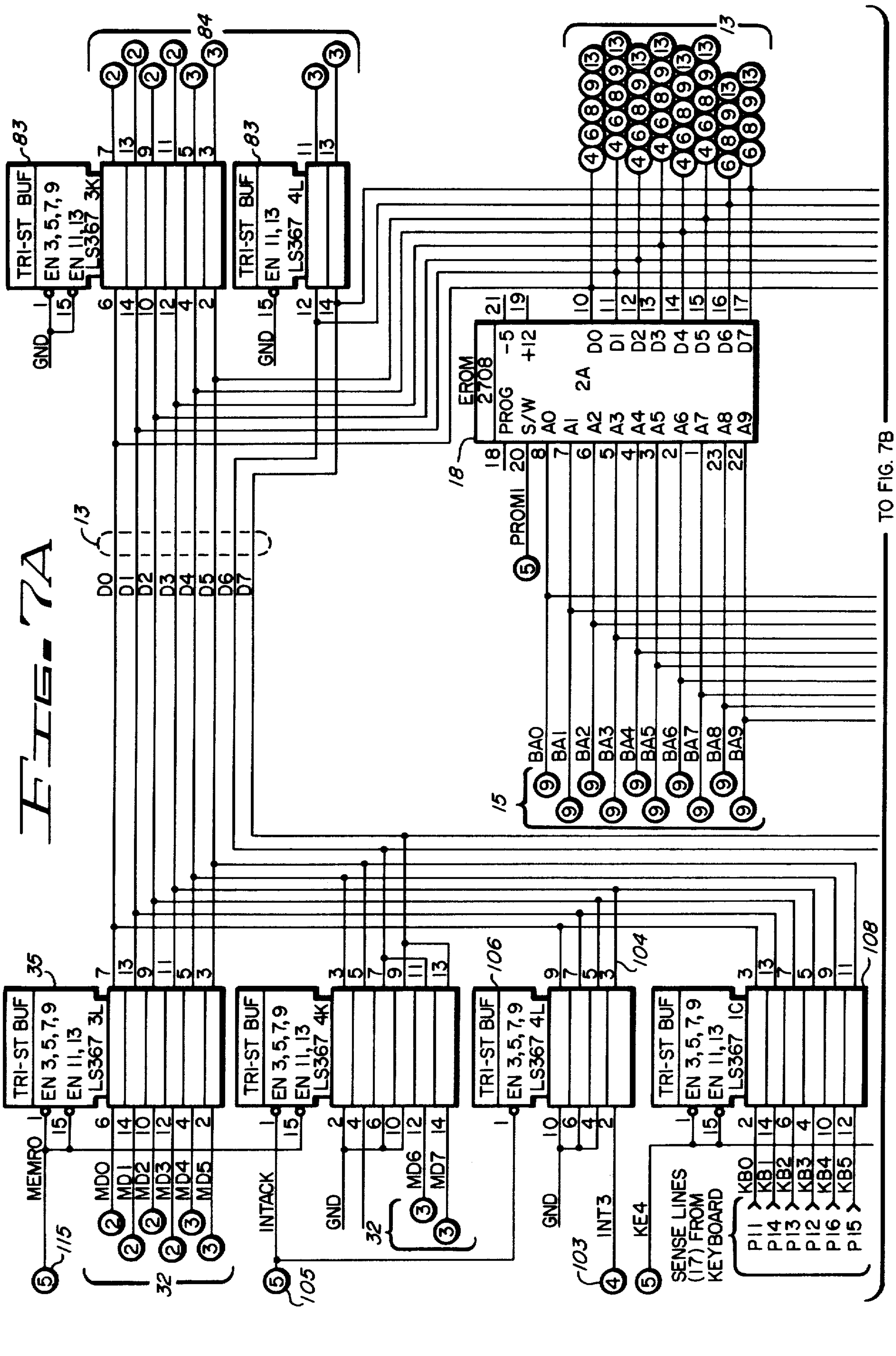
FIGS. 7A and 7B are a logic diagram of the relationship of the EROM program memory to the address and data buses.
Figure 7B:
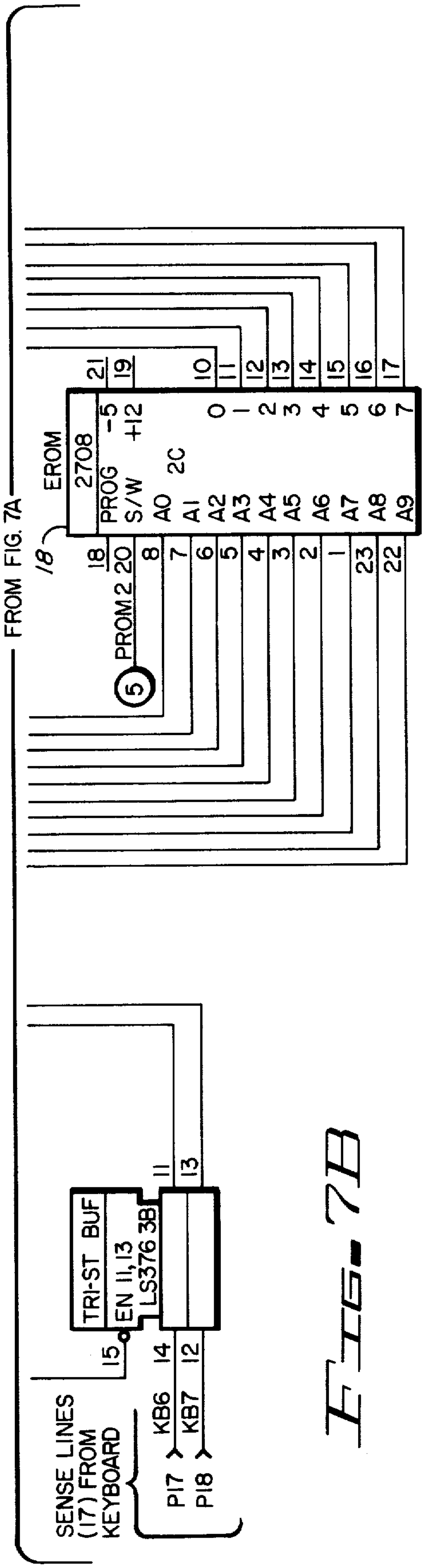

The character to be stored in RAM 25 arrives on lines DBO-7 in FIGS. 2 and 3 from tri-state buffer 83 (shown in more detail in FIG. 7). The character to be displayed leaves the RAM on lines MDO-7 and goes to character generator ROM 33 in FIG. 4A and limited graphics PROM 34 in FIG. 10.

FIG. 6 is a more detailed logic diagram of the horizontal and vertical address counters 22 and 26. Horizontal address counter 22 is used to count the Advhosp signal periods to keep track of the horizontal address of the character being displayed and for control of the horizontal sync and blanking. Between the counts of zero and sixty four, each character in the line of text being displayed is accessed from the RAM. Horizontal address counter 22 is advanced once for each character displayed by means of the Advhosp signal on line 23. When the counter reaches a count of 72 (HC64 and HC8), the Hsync flag, 79 in FIG. 4, is set by the $Load signal, 86 in FIG. 4, from NAND gate 87 (also in FIG. 4).

Each Hsync pulse advances the vertical address counter 26 by one count via the Nhsync signal on line 79. The first three bits of its output, VSR A, B and C, are sent to the character generator ROM 33 via lines 58–60. Output bits VSR 1, 2, 4, 8 and 16 are the vertical address of the line being traced.

FIG. 5 is a more detailed logic diagram of the 12.5 mhz clock 19. Also shown are the logic of the divide by nine counter 21 and some control gates combining various signals from microprocessor 14 to generate several control signals used to control the various tri-state buffers, status registers, counters, and memories in the system.

switch the "A" inputs to the output lines 82 when it is low and the "B" inputs to the outputs when it is high. The "A" inputs are connected to the horizontal and vertical address counter outputs and the "B" inputs are connected to address bus 15 as shown in FIG. 6. In FIG. 5, ISW on line 31 is the output of NAND gate 150 which has inputs connected to the "5" and "6" outputs of four line to ten line decoder 151. The "5" output goes low when a binary five appears at inputs 152 and similarly for the "6" output. The outputs of decoder 151 are normally high. The ISW signal will go high then only when the A10–A12 bits and the MI/O signal on line 153 from microprocessor 14 form either a binary 5 or binary 6 indicating microprocessor 14 wants to write to RAM 25. The MI/O signal is a control signal output from microprocessor 14 indicating whether the current operation of the microprocessor references memory or I/O.

The $Mem signal on line 135 serves as the Read/-Write control signal for RAM 25. When it is high the RAM will read data at its data inputs DBØ–DB7 in FIGS. 2 and 3 and store it at the address specified at its address inputs MA1-MA10. When $Mem is low, the RAM will write the data stored at the location specified at its address inputs to its data output lines MDØ–MD7. The $Mem signal will go low only when ISW is high and the $WRP signal on line 153 is high. $WRP is low only when the R/W signal on line 154, the WRP signal on line 155, and the OPREQ signal on line 156 all are low. The R/W signal from microprocessor 14 is low when the microprocessor wishes to read from data bus 13. The WRP signal from microprocessor 14 is normally low and provides a positive going pulse only when a write opertion is being performed. The OPREQ signal is low at all times except when microprocessor 14 wishes to inform external devices that all address, data, and control signals at its pins are valid. Thus it is seen that the ISW signal, when high, gates the $WRP signal through NAND gate 157 to become the $Mem signal. When WRP, OPREQ, and R/W are all high, microprocessor 14 is performing a write operation to the address specified on the address bus 15 and $WRP will be low making $Mem high. This causes RAM 25 to receive the character data on DBØ–DB7 (data bus 13) and store it at the address specified on the MA1–MA10 lines. The characteristics of the other control signals of FIG. 5 will be obvious to those skilled in the art in consideration of the system operation and in conjunction with the information on the control signals of the Signetics 2650 microprocessor contained in Signetics components data publications all of which are incorporated herein by reference. The Texas Instruments TTL Data Book 2d edition, gives electrical data and pin assignments for the various TTL chips in the system and it too is incorporated herein by reference.

Clock 19 utilizes two gates 158 and 159 biased in the active region at threshold by resistors 160–162. Crystal 163 acts as a series resonant circuit to provide a feedback path from the output of gate 158 to the input of gate 159 causing oscillation to occur at the resonant frequency. The output signal, $C, leaves on line 20 and is divided to a lower frequency Advhosp signal by divide by nine counter 21. The Advhosp signal on line 23 occurs every ninth cycle of the $C signal. The Advhosp signal is connected to the "C" output of the counter so that Advhosp occurs in the middle of the count from zero to nine. This is necessary so that horizontal address counter 22 in FIG. 6 changes the horizontal address count while the last horizontal address is causing propagation of character data from RAM 25 through character generator ROM 33 to character shift register 164.

It takes a few hundred nanoseconds to access the character data from RAM 25 and to access the dot pattern from character generator 33 or graphics PROM 34. Therefore, the parallel load command, Shift-Load on line 168 in FIGS. 4 and 10, to character shift register 21 and graphics shift register 22 should be delayed slightly from the time the address of the character to be displayed is presented to the RAM. To create this delay, the Shift-Load signal is derived from the WCR signal on line 167 from FIG. 5. The WCR signal is a pulse of one clock period duration which occurs when divide by nine counter 21 reaches the count of nine. WCR resets the divide by nine counter and causes loading of the character and graphics shift registers by sending Shift-Load low if the Line-Active flag is set. Since WCC on line 23 is on for four counts and off for five during the count to nine, 5×80 or 400 nanoseconds of delay is created between incrementation of horizontal address counter 22 to the next address and loading of a shift register with the dot pattern from the last address.

Figure 9:
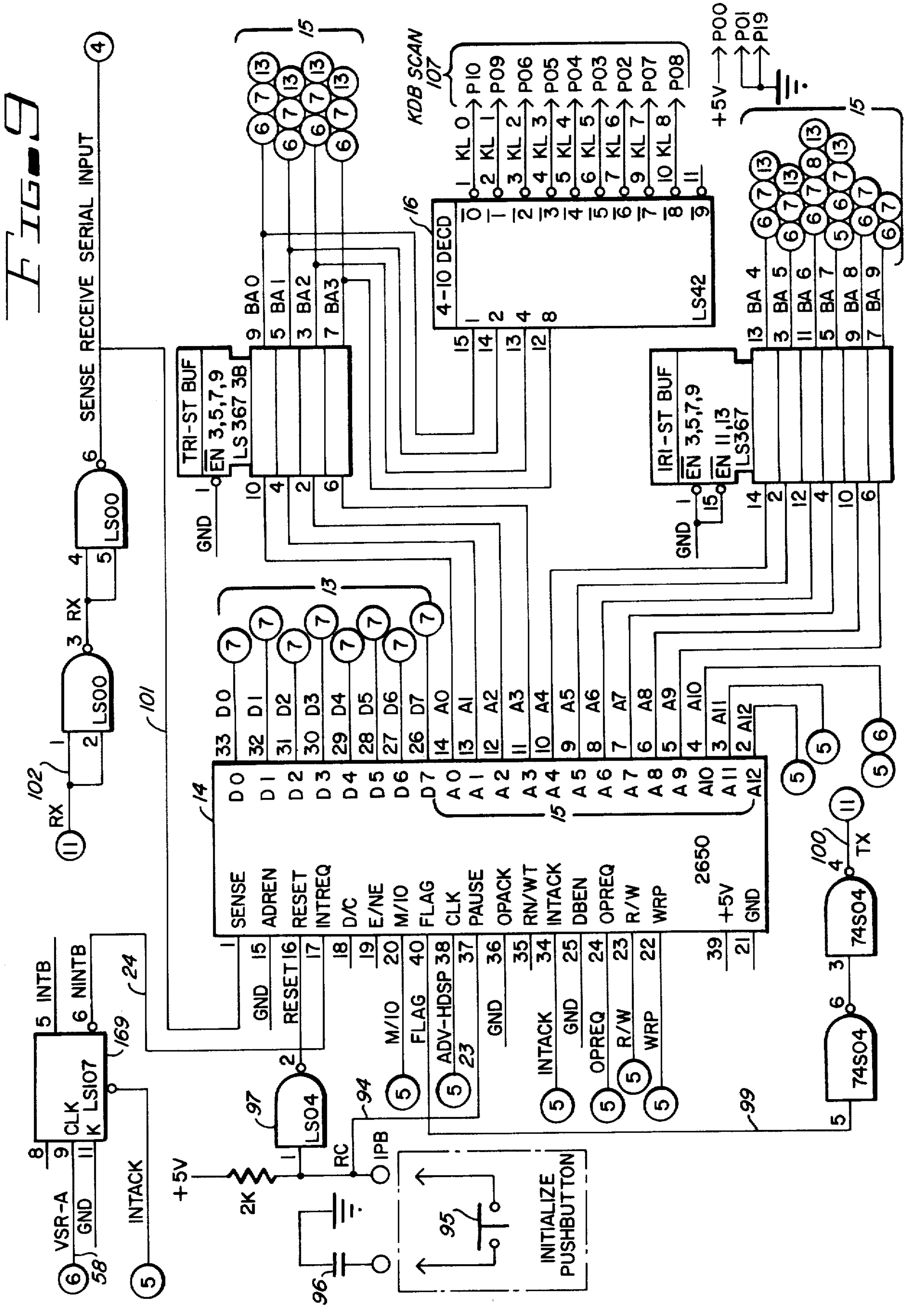
FIG. 9 is a logic diagram of the microprocessor, address bus, and keyboard output.

Microprocessor 14, shown in more detail in FIG. 9, is initialized at powerup by the RC signal on line 94 connected to a resistor-capacitor network. When power is applied via initialize pushbutton 95, capacitor 96 holds the pause input low via line 94. In the meantime, the reset input is held high by inverter 97. As the capacitor charges up, the reset input goes low and the microprocessor commences operation.

Serial input from the modem is handled by microprocessor 14 via the Sense input on line 101. When no character is being received, the Sense input is high. The program continually interrogates this input to determine when a character is being received, with the beginning of a character indicated by a high to low transition on the Sense input line. Modem 10 drives this Sense input via the RX signal on line 102. The change on Sense line 101 is latched into bit six of video status register 30 in FIG. 4 and changes the Int 3 signal on line 103. The change in Int 3 changes the hardware generated interrupt vector on the next interrupt by changing the information on data bus 13 via line 104 in FIG. 7. When microprocessor 14 receives an interrupt request, it drives the Intack signal low on line 105 in FIGS. 9 and 7 which enables tri-state buffer 106. The lowering of Intack indicates that microprocessor 14 is ready to receive the interrupt vector from the data bus. The interrupting device is responsible for supplying this interrupt vector to the data bus. This occurs with the transmission of Int 3 through tri-state buffer 106 to line 104 which is connected to D3 of data bus 13. The subroutine entered via this interrupt vector sets bit six of the video status register 30 in FIG. 4 to keep the interrupt vector pointed to the new routine. The Sense bit is then periodically tested so that the incoming character may be assembled.

Figure 14:
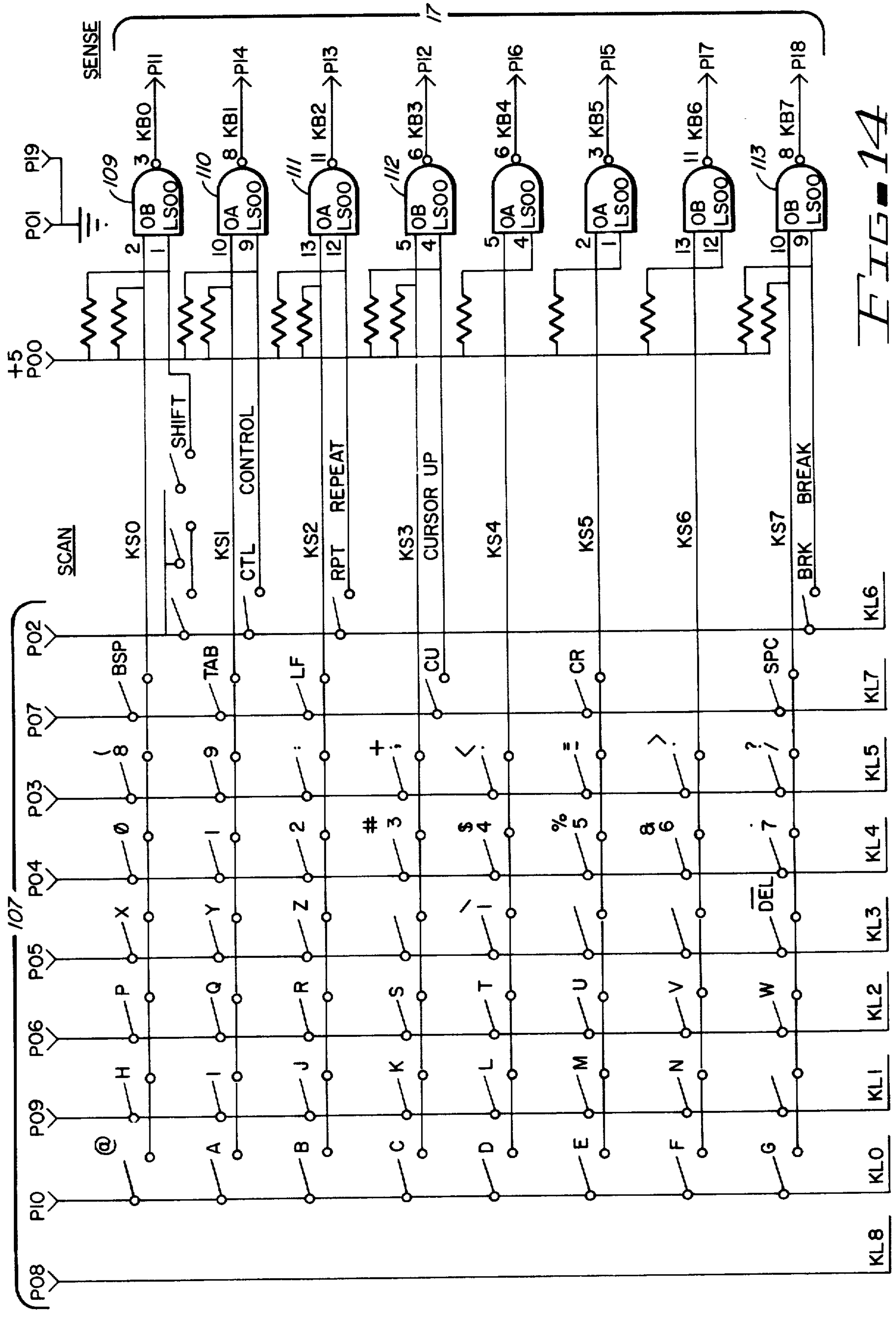
FIG. 14 is a logic diagram of the keyboard.

Microprocessor 14 also scans keyboard 12, shown in more detail in FIG. 14, via Scan lines 107. A seven bit ASCIIcode is used by the keyboard with the four most significant bits (MSB) represented by the BAØ-BA3 lines of address bus 15 in FIG. 9. These lines are decoded by four line to ten line decoder 16 of FIG. 9. Decoder 16 decodes BAØ-BA3 into a low on one of the ten Scan lines. These Scan lines are lowered one by one by a series of I/O read instructions executed by microprocessor 14. Each of the Scan lines is connected to one side of a column of switches in the keyboard while each of eight Sense lines 17 are connected to the other side of a row of keyboard switches. These eight Sense lines 17 are selectively switched onto data bus 13 under control of microprocessor 14 by tri-state buffer 108 in FIG. 7. The bits from the Sense lines are encoded by microprocessor 14 into the three least significant bits of the ASCII character code. The shift, control, repeat, cursor positioning and break keys are connected to Sense lines 17 through NAND gates 109–113 respectively to enable use of only eight Sense lines.

A keyboard scan is performed once for each half frame. During scanning of the Scan lines by microprocessor 14, the data from the Sense lines is read and loaded into an internal register of the microprocessor. There the data is tested after each scan for non-zero to indicate a switch closure making it possible to check for depression of two keys simultaneously. When a character is sensed, the scanning is continued. Only when the same character has been sensed several times in succession, does microprocessor 14 assume it is a valid character. This procedure eliminates switch bounce.

A parallel port can be included in the system such that data may be received in parallel format from another data processing device and displayed on the screen. Also, data received from the modem or keyboard may be sent out from the parallel port to the other data processing device at the option of the operator by depressing certain control characters on the keyboard.

The terminal may be thought of as having three input peripherals (keyboard, modem, parallel port) and three output peripherals (screen, modem, and parallel port). The software is written such that, by use of control characters from the keyboard, specific input peripherals may be assigned to one or more output peripherals. A three byte table is used to record the desired attachments. The first byte represents the input parallel port, the second byte is the input line from the modem, and the third byte is the keyboard. If bit seven is on in any of these bytes, then the screen is attached to the input peripherals represented by the bytes with bit seven on. If bit six is on, then the output line to the modem is connected to that particular input peripheral. Likewise, bit five represents the output parallel port.

Figure 8:
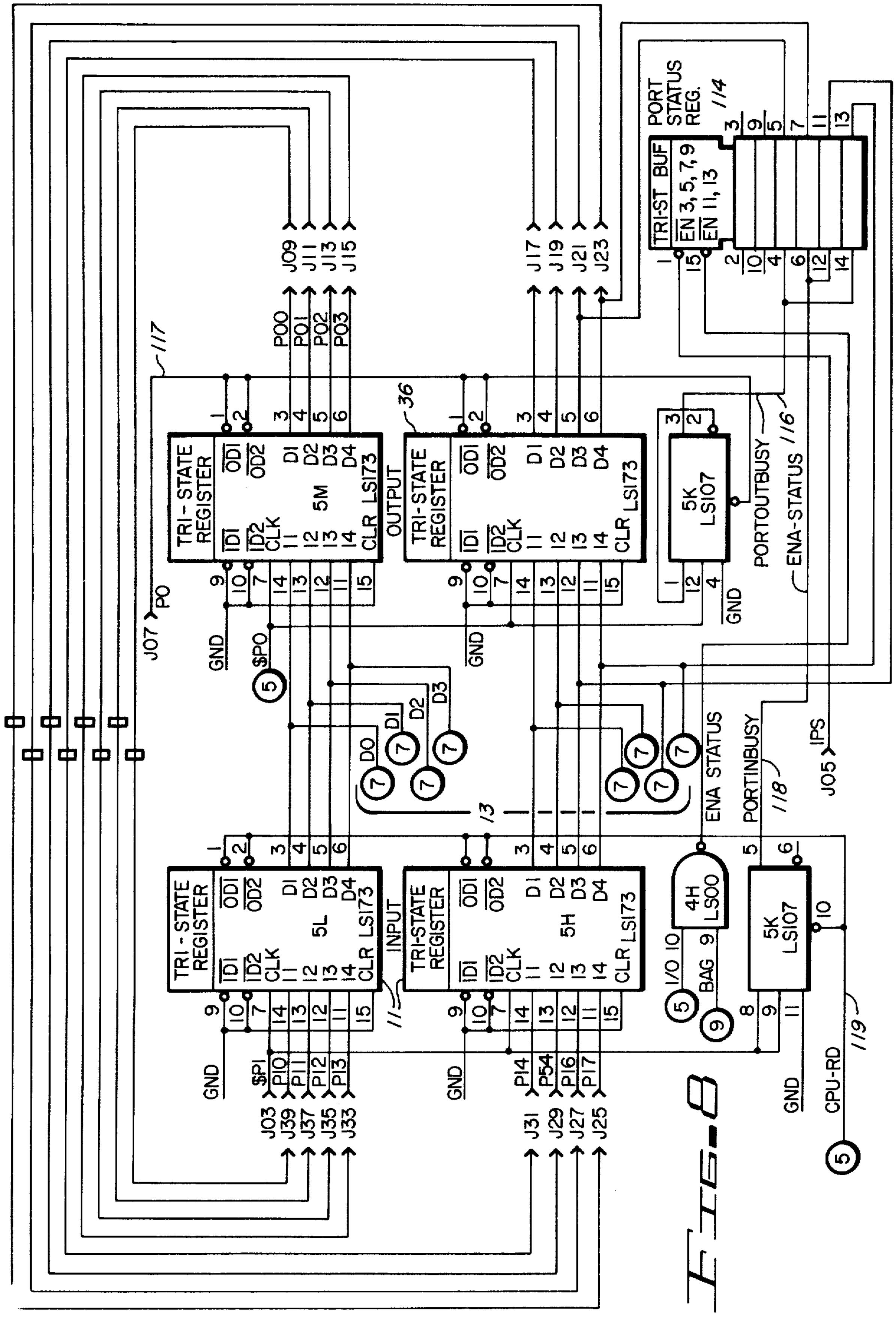
FIG. 8 is a logic diagram of the parallel port.

FIG. 8 shows the logic arrangement of the external parallel port 11. It consists of two eight bit tri-state registers, input register 11 for receiving and output register 36 for transmitting. When a character is transmitted, output register 36 is loaded and the Portoutbusy flag on line 116 is set. The device receiving the character must sense the Portoutbusy flag to determine when the character for transmission has been loaded from data bus 13. When output register 36 has been read, the Portoutbusy flag will be reset via line 117 to allow the terminal to load another character.

A similar situation exists for the input register 11. When a character is transmitted to the terminal, the Portinbusy flag on line 118 will be set when a character is loaded into the register. The software interrogates the Portinbusy flag and, when set, will read the contents of input register 11 resetting the Portinbusy flag via line 119. The external device must sense the status of the Portinbusy flag before attempting to reload the input register.

Figure 11:
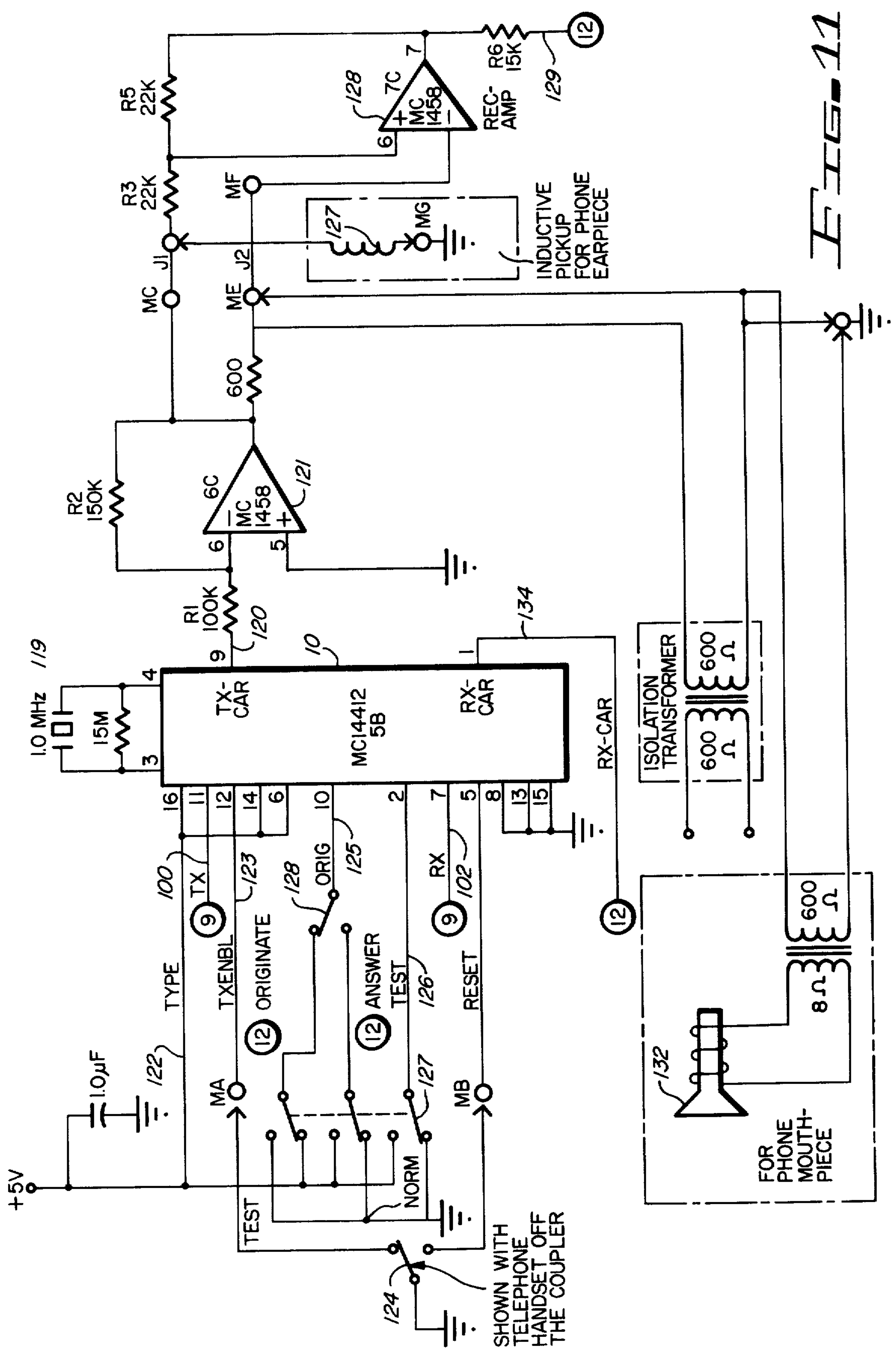
FIG. 11 is a logic diagram of the modem/telephone interface.

The modem 10 shown in FIG. 11 utilizes frequency shift keying modulation. Two frequencies are used to represent a logical zero (space) and a logical one (mark), the two frequencies being 200 hertz apart. Two pairs of frequencies are used for two way communications making the system of the full duplex variety. The lower pair of frequencies is used for transmission by the terminal while the higher pair is used for receiving in the originate mode. The modem may also be switched to the answer mode where the situation is reversed. During full duplex operation, both devices are transmitting at the same time.

When no data is being transmitted, modem 10 sends a continuous mark frequency or logical one. Character transmission commences with a start bit which is the first change from a high level to a low level. The marks and spaces making up the character to be transmitted follow this start bit. The character can, if desired, be followed by a parity bit and will be completed by transmission of a stop bit returning the communications line to the continuous mark state. This mark state will continue until the next character is sent.

Modem 10 is capable of speeds up to 600 baud and can be a Motorola MC 14412. The chip contains the complete frequency shift keying modulator and demodulator circuitry necessary for FSK modulation. A one mhz crystal 119 combines with an internal oscillator in this chip to provide a stable frequency reference. The oscillator output is divided down internally and passed through an internal seven stage frequency counter. The data to be transmitted enters modem 10 on the digital format TX signal line 100 from microprocessor 14 where it enters an internal modulator frequency decoder. It is modulated there using FSK techniques. The modulator frequency decoder is linked to a seven stage frequency counter and combines with said frequency counter and an internal digital sine wave generator to provide an FSK modulated digitally synthesized sine wave output on line 120 as the TX car signal. In the originate mode, this sine wave is 1270 Hz for a mark and 1070 Hertz for a space in U.S. Standard format while in the answer mode, a mark is 2225 Hz and a space is 2025 Hertz. This output signal is amplified in transmitter op amp 121 and fed to a speaker 132 for a telephone handset mouthpiece.

The Type signal on line 122 selects either U.S. or C.C.I.T.T. operational frequencies for both transmitting and receiving data. The TXENBL signal on line 123 enables the TX car output signal on line 120 when microswitch 124 sets the TXENBL signal at logical one. This microswitch is operated by the position of the telephone handset in the cradle.

The Orig signal on line 125 selects the pair of transmitting and receiving frequencies used during modulation and demodulation. When this signal is high, the U.S. originate mode or the C.C.I.T.T. channel No. 1 mode is selected. When the Orig signal is zero, the U.S. answer mode or the C.C.I.T.T. channel No. 2 mode is selected.

The test signal on line 126 will, when high, cause the self test mode to be entered where the demodulator is switched over to demodulating the transmitted signal from the modem itself. The self test and answer-originate mode selections are made by operation of switches 127 and 128.

Figure 12:
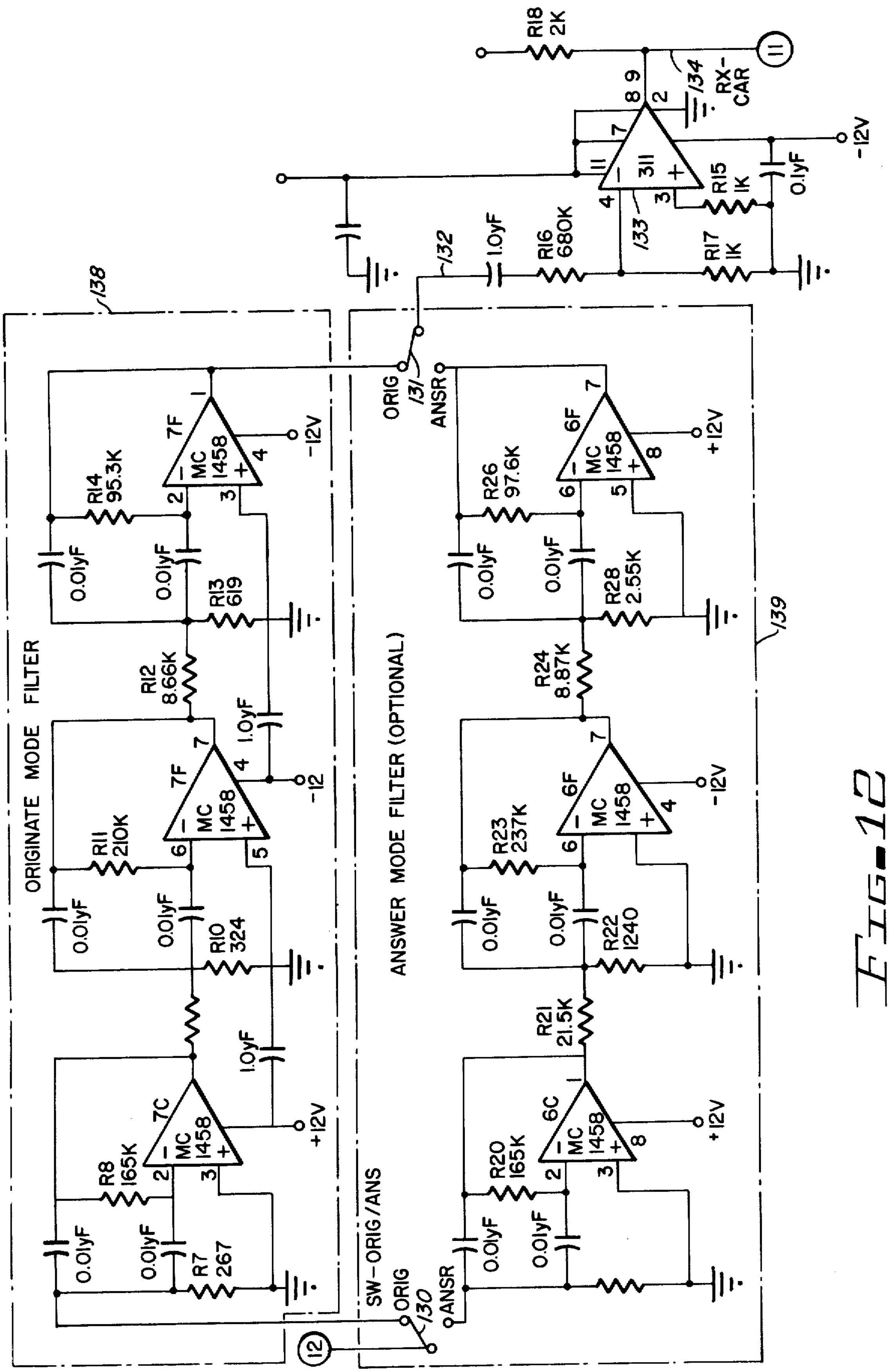
FIG. 12 is a circuit diagram of the modem filters.

The received signal from the telephone handset is picked up by inductive pickup 127 and amplified by receiver op amp 128. The output, Rec. Amp on line 129, is passed through either the three stage originate mode filter 138 or the three stage answer mode filter 139 of FIG. 12. Selection of the filter is made by switches 130 and 131. Each filter is comprised of three op amps tuned to form a very sharply defined bandpass filter which will amplify the received frequency pair and reject all other frequencies.

The output from these filters on line 132 is squared up and limited by signal limiter op amp 133 and applied as the RX car signal on line 134 to the demodulator of modem 10 in FIG. 11.

Modem 10 passes the square wave RX car signal through an internal level change detector and demodulator counter linked to the internal one mhz oscillator. The signal is then passed through an internal demodulator decoder for conversion to a digital signal for output as the RX signal on line 102 to microprocessor 14.

Although the invention has been disclosed in terms of a preferred embodiment, other equivalent embodiments performing similar functions in a similar manner with similar means are intended to be included under the aegis of the concepts disclosed herein.

What is claimed is:

1. A computer terminal apparatus for sending data to and receiving data from another data processing device comprising:
   (a) a keyboard means for allowing entry of data and control signals by an operator;
   (b) a port means for interfacing with said other data processing device so that data may be received from and sent to said other data processing device;
   (c) logic means selectively coupled to said keyboard means and said port means, said logic means including means for scanning said keyboard means, means for receiving and encoding data and control signals therefrom, means for presenting data received by said computer terminal at an output thereof, and means responsive to a predetermined control signal received from said keyboard for simultaneously transmitting data being received from said keyboard out through said port means to said other data processing device, said logic means including a microprocessor programmed to effect the stated functions, said microprocessor having an address bus, a data bus and a control output signal, and where said computer terminal apparatus includes a decoder means for decoding signals on a portion of said address bus, and where said keyboard is comprised of a matrix of switches, one side of each column of said switches being connected to a scan line connected to one of the outputs of said decoder means, and each row in said matrix of switches having one side connected to a sense line, said apparatus also including a tri-state buffer having a plurality of inputs connected respectively to said sense lines and an output connected to said data bus, said tri-state buffer having a control input for receiving said control output signal from said microprocessor for connecting said sense lines to said data bus when said microprocessor effects the scan of said keyboard means, said scanning being effected by said microprocessor by sequentially addressing each said scan line and reading the output of said tri-state buffer via said data bus.

2. A computer terminal apparatus for sending data to and receiving data from other data processing devices comprising:

(a) a keyboard means for allowing entry of data and control signals by an operator;

(b) a parallel port means for interfacing with said one of said other data processing devices so data may be received from and sent to said other data processing device in parallel format;

(c) a modem means for interfacing with another of said other data processing devices over a distance via a communications network, said modem means for converting binary data from said computer terminal into signals suitable for transmission over said communications network, and for converting signals received from said other data processing device over said communications network into binary data for use by said computer terminal;

(d) logic means selectively coupled to said keyboard means, said port means and said modem means, said logic means including means for scanning said keyboard means, means for receiving and encoding data and control signals therefrom, means for sensing when data is being received by said parallel port means or said modem means and means for presenting the data received from any of these inputs to said computer terminal at an output thereof, said logic means including a microprocessor programmed to effect the stated functions, said microprocessor having an address bus, a data bus and a control output signal, and where said computer terminal apparatus includes a decoder means for decoding signals on a portion of said address bus, and where said keyboard is comprised of a matrix of switches, one side of each column of said switches being connected to a scan line connected to one of the outputs of said decoder means, and each row in said matrix of switches having one side connected to a sense line, said apparatus also including a tri-state buffer having a plurality of inputs connected respectively to said sense lines and an output connected to said data bus, said tri-state buffer having a control input for receiving said control output signal from said microprocessor for connecting said sense lines to said data bus when said microprocessor effects the scan of said keyboard means, said scanning being effected by said microprocessor by sequentially addressing each said scan line and reading the output of said tri-state buffer via said data bus.

* * * * *